United States Patent
Lenneman et al.

(10) Patent No.: US 8,160,760 B2
(45) Date of Patent: Apr. 17, 2012

(54) HUMAN-MACHINE INTERFACE DEVICE FOR AN AUTONOMIC VEHICLE CONTROL SYSTEM

(75) Inventors: John K. Lenneman, Okemos, MI (US); William C. Barley, Evanston, IL (US); Joseph F. Szczerba, Grand Blanc, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/565,129

(22) Filed: Sep. 23, 2009

(65) Prior Publication Data

US 2011/0071717 A1 Mar. 24, 2011

(51) Int. Cl.
*G01F 7/00* (2006.01)
(52) U.S. Cl. ........... 701/21; 701/53; 180/170; 180/6.38; 74/335; 74/471; 74/473.1
(58) Field of Classification Search .................... 701/23, 701/51; 180/170, 6.38, 6.2; 74/335, 471, 74/527, 473.1; 702/96
See application file for complete search history.

(56) References Cited

U.S. PATENT DOCUMENTS

| | | | | |
|---|---|---|---|---|
| 3,567,874 A * | 3/1971 | Strobel | ...................... | 200/16 D |
| 4,523,886 A * | 6/1985 | Reeves | .......................... | 414/641 |
| 4,663,713 A * | 5/1987 | Cornell et al. | ................... | 701/52 |
| 5,305,663 A * | 4/1994 | Leonard et al. | ............... | 475/123 |
| 5,460,582 A * | 10/1995 | Palansky et al. | .............. | 477/138 |
| 5,887,669 A * | 3/1999 | Ostler et al. | ................. | 180/53.4 |
| 5,918,195 A * | 6/1999 | Halgrimson et al. | ........... | 702/94 |
| 6,065,365 A * | 5/2000 | Ostler et al. | .................... | 74/528 |
| 6,422,104 B2 * | 7/2002 | Kamiya | .......................... | 74/335 |
| 6,502,657 B2 * | 1/2003 | Kerrebrock et al. | .......... | 180/218 |
| 6,647,328 B2 * | 11/2003 | Walker | ............................. | 701/36 |
| 6,718,246 B2 * | 4/2004 | Griffith et al. | ................... | 701/50 |
| 7,220,927 B2 | 5/2007 | Browne et al. | | |
| 2001/0025535 A1 * | 10/2001 | Kamiya | .......................... | 74/335 |

(Continued)

FOREIGN PATENT DOCUMENTS

JP 2000-018999 * 1/2001

(Continued)

OTHER PUBLICATIONS

Multi-UAV formation maneuvering control based on Q-Learning fuzzy controller; Pang Rui; Advanced Computer Control (ICACC), 2010 2nd International Conference on; vol. 4; Digital Object Identifier: 10.1109/ICACC.2010.5486961; Publication Year: 2010 , pp. 252-257.*

(Continued)

*Primary Examiner* — Cuong H Nguyen

(57) ABSTRACT

An apparatus for generating autonomic control mode commands to an autonomic control system in a vehicle to execute an autonomic vehicle maneuver in response to an operator command includes a control module signally connected to the autonomic control system and an input device. The input device is manipulated by an operator to transition among operator command positions and configured to generate signal outputs monitored by the control module indicating the operator command positions including a neutral position, a detent position and an extended detent position. The input device further includes a reset state corresponding to the neutral position and monitored by the control module, an initiation state corresponding to the extended detent position and monitored by the control module, and a command state corresponding to the detent position and monitored by the control module.

30 Claims, 4 Drawing Sheets

U.S. PATENT DOCUMENTS

| | | | | |
|---|---|---|---|---|
| 2001/0056544 | A1* | 12/2001 | Walker | 713/200 |
| 2002/0036104 | A1* | 3/2002 | Kerrebrock et al. | 180/6.2 |
| 2003/0204297 | A1* | 10/2003 | Griffith et al. | 701/50 |
| 2004/0049324 | A1* | 3/2004 | Walker | 701/1 |
| 2006/0054478 | A1* | 3/2006 | Browne et al. | 200/61.27 |
| 2008/0091309 | A1* | 4/2008 | Walker | 701/1 |
| 2009/0287383 | A1* | 11/2009 | Fujii et al. | 701/51 |

FOREIGN PATENT DOCUMENTS

| | | | |
|---|---|---|---|
| JP | 2008-127659 | * | 5/2008 |

OTHER PUBLICATIONS

H∞ state feedback control for UAV maneuver trajectory tracking; Yusong Jiao; Juan Du; Xinmin Wang; Rong Xie; Intelligent Control and Information Processing (ICICIP), 2010 International Conference on; Digital Object Identifier: 10.1109/ICICIP.2010.5564257 Publication Year: 2010 , pp. 253-257.*

Fuzzy trajectory tracking control of an autonomous air vehicle; Soleymani, T.; Saghafi, F.;Mechanical and Electronics Engineering (ICMEE), 2010 2nd International Conference on; vol. 2; Digital Object Identifier: 10.1109/ICMEE.2010.5558409 Publication Year: 2010 , pp. V2-347-V2-352.*

Torque estimation in electrical power steering systems; Chabaan, R.C.; Vehicle Power and Propulsion Conference, 2009. VPPC '09. IEEE; Digital Object Identifier: 10.1109/VPPC.2009.5289769; Publication Year: 2009 , pp. 790-797.*

Path following system of small unmanned autonomous vehicle for surveillance application; Sasongko, R.A.; Sembiring, J.; Muhammad, H.; Mulyanto, T.; Control Conference (ASCC), 2011 8th Asian; Publication Year: 2011 , pp. 1259-1264.*

* cited by examiner

HUMAN-MACHINE INTERFACE DEVICE FOR AN AUTONOMIC VEHICLE CONTROL SYSTEM

TECHNICAL FIELD

This disclosure is related to autonomic control systems for vehicles.

BACKGROUND

The statements in this section merely provide background information related to the present disclosure and may not constitute prior art.

Known vehicles use autonomic control systems to control vehicle operation. For example, vehicles use cruise control systems to maintain a travel speed of the vehicle at an operator-selected speed. Further, vehicles use adaptive cruise control systems to control speed based on both the operator-selected speed and the presence of and distance to another vehicle in a projected travel path. Exemplary vehicle detection systems used by adaptive cruise control systems include radar detection devices and lidar detection devices to detect the position and speed of other vehicles within the projected travel path.

Known vehicle systems include autonomic vehicle control systems that include maneuvering capabilities. Known autonomic vehicle control systems include maneuvering capabilities for controlling the direction of the vehicle and thereby controlling the travel path and speed of the vehicle.

An example of an autonomic control system having maneuvering capability is an autonomic lane-change system. Known autonomic lane-change systems include a vehicle detection system to detect other vehicles in a current lane of the vehicle and vehicles in lanes adjacent to the vehicle. Known vehicle detection systems include radar detection devices and lidar detection devices to detect the position and speed of the other vehicles. The autonomic lane-change system may include a human-machine interface device to receive commands from the vehicle operator and actuators to automatically steer the vehicle to change vehicle travel direction in response to the commands.

In a vehicle using a known autonomic lane-change system, a vehicle operator commands activation of the autonomic lane-change system through the human-machine interface device, thereby indicating a desired lane change. When the autonomic lane-change system is activated, the autonomic lane-change system actively monitors adjacent travel lanes to determine whether other vehicles are present in the adjacent lanes. When the autonomic lane-change system detects an acceptable level of clearing for entry of the vehicle into the adjacent lane, the autonomic lane-change system operates the steering system of the vehicle to maneuver the vehicle into the adjacent lane.

SUMMARY

An apparatus for generating autonomic control mode commands to an autonomic control system in a vehicle to execute an autonomic vehicle maneuver in response to an operator command includes a control module signally connected to the autonomic control system and an input device. The input device is manipulated by an operator to transition among operator command positions and configured to generate signal outputs monitored by the control module indicating the operator command positions including a neutral position, a detent position and an extended detent position. The input device further includes a reset state corresponding to the neutral position and monitored by the control module, wherein the control module commands the autonomic control system to deactivate the autonomic control mode, an initiation state corresponding to the extended detent position and monitored by the control module, wherein the control module commands the autonomic control system to enable the autonomic control mode, and a command state corresponding to the detent position and monitored by the control module, wherein the control module commands the autonomic control system to activate the autonomic control mode when the input device is operatively manipulated from the extended detent position and further does not command the autonomic control system to activate the autonomic control mode when the input device is operatively manipulated from the neutral position.

BRIEF DESCRIPTION OF THE DRAWINGS

One or more embodiments will now be described, by way of example, with reference to the accompanying drawings, in which.

DETAILED DESCRIPTION

Figure 1:
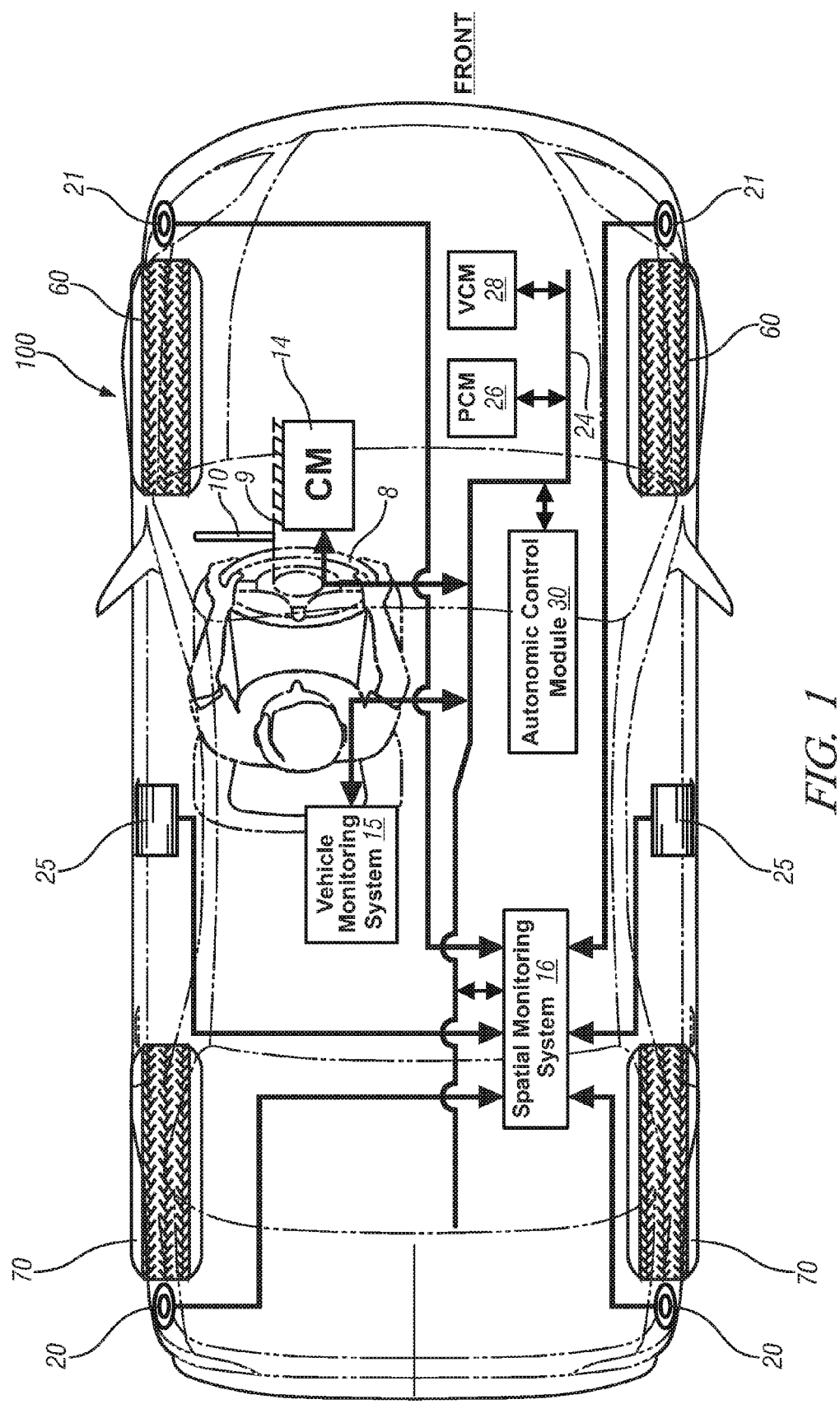
FIG. 1 is a schematic depiction of a vehicle system, in accordance with an exemplary embodiment of the present disclosure.
Figure 2:
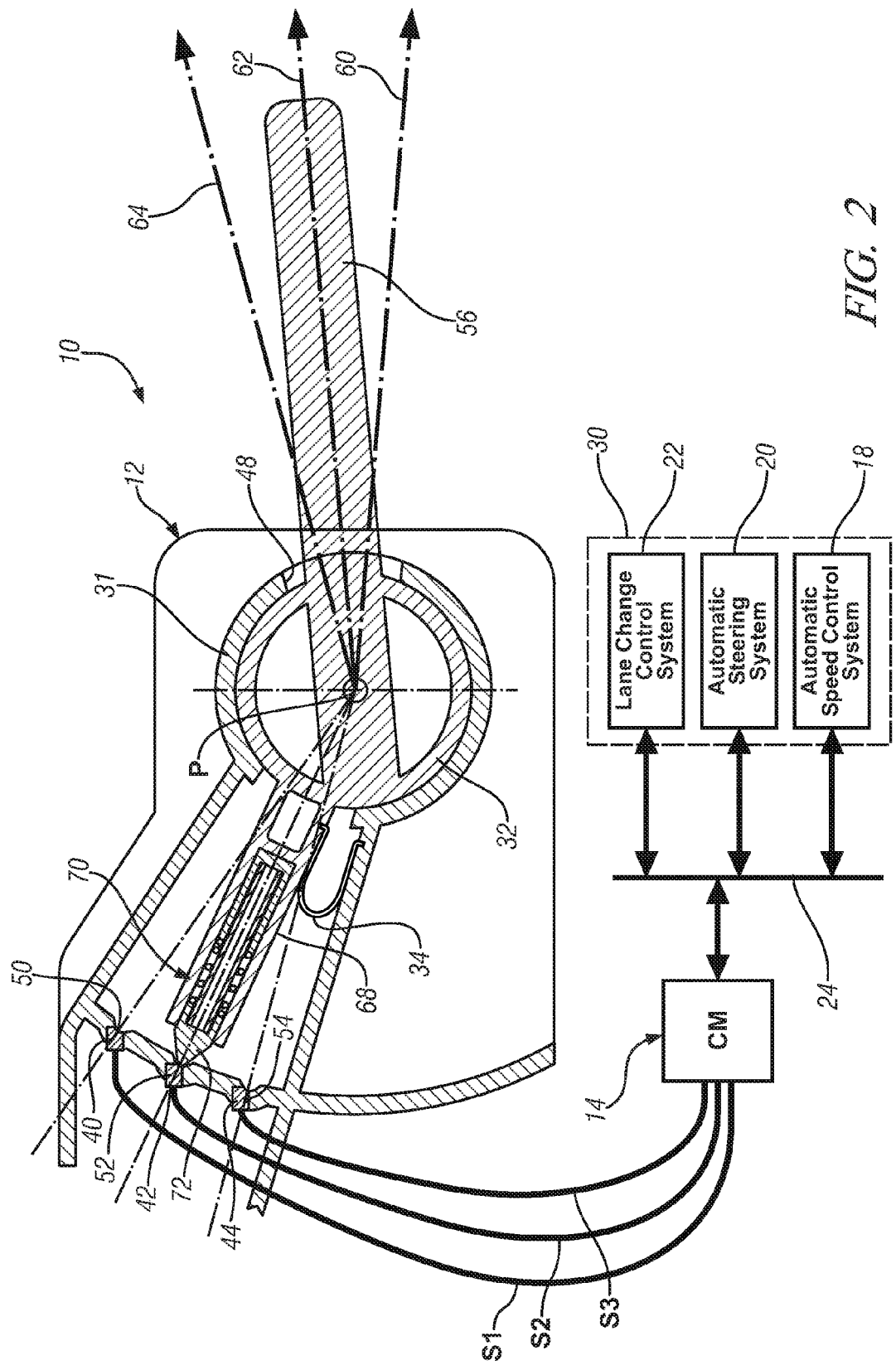
FIGS. 2-4 are schematic depictions of human-machine interface devices, in accordance with exemplary embodiments of the present disclosure.
Figure 3:
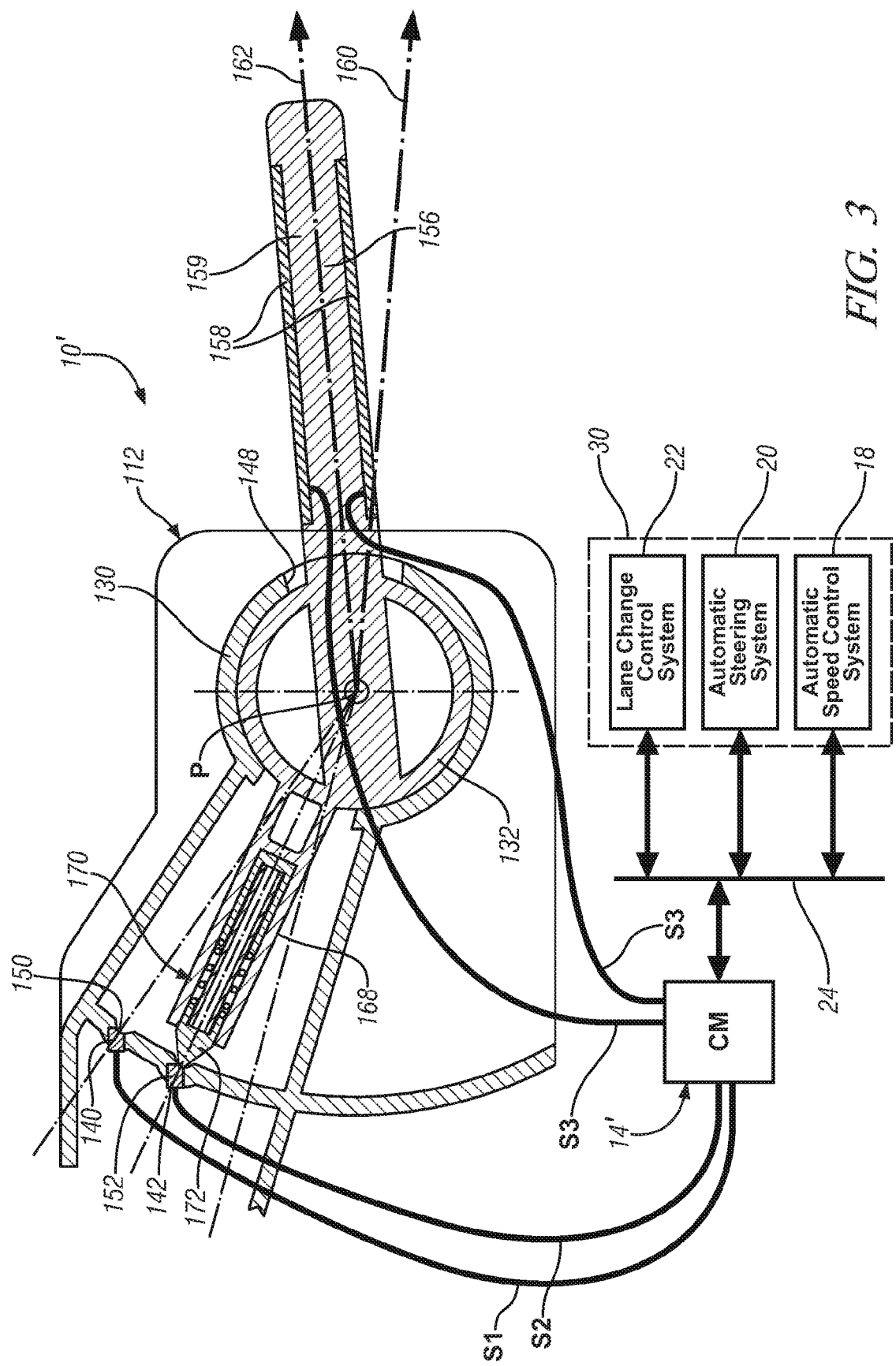
Figure 4:
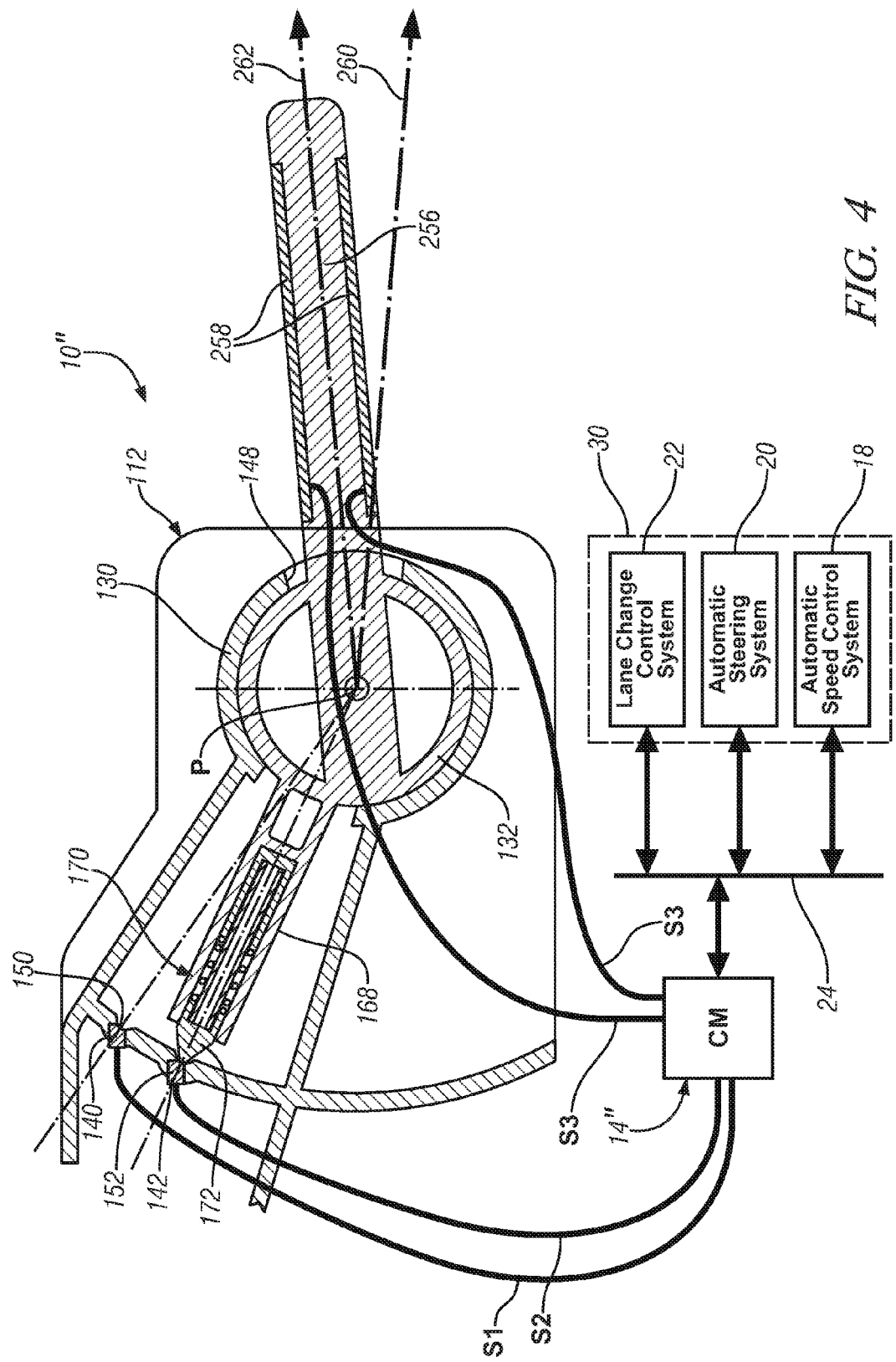

Referring now to the drawings, wherein the showings are for the purpose of illustrating certain exemplary embodiments only and not for the purpose of limiting the same, FIG. 1 in conjunction with FIGS. 2, 3, and 4 schematically show a vehicle 100 illustrative of an embodiment of the invention. The illustrated vehicle 100 includes a four-wheel passenger vehicle with steerable front wheels 60 and fixed rear wheels 70, although the concepts described herein apply to vehicles that are steerable using the front and/or the rear wheels. The vehicle 100 includes a spatial monitoring system 16 and a vehicle monitoring system 15. The vehicle 100 is controlled using a powertrain control module 26, a vehicle control module 28, and an autonomic control system 30, including for example lane change control system 22, automatic steering system 20 and automatic speed control system 18. The spatial monitoring system 16, vehicle monitoring system 15, powertrain control module 26, vehicle control module 28, and autonomic control system 30 preferably communicate using a local area network communications bus 24. One having ordinary skill in the art will recognize that the arrangement of the aforementioned control modules and monitoring systems is illustrative and does not restrict or limit the disclosure to such a configuration.

The spatial monitoring system 16 includes a control module signally connected to sensing and detection devices operative to detect remote objects proximate to the vehicle 100. The spatial monitoring system 16 preferably determines a linear range, relative speed, and trajectory of each proximate remote object and communicates such information to the autonomic control system 30. The sensing devices, as shown, can include front corner sensors 21, rear corner sensors 20, and side sensors 25, although the disclosure is not so limited. The sensing and detection devices may include, e.g., ultrasound sensors, vision sensors, infrared devices, lidar devices, and radar devices.

The autonomic control system 30 controls operation of the vehicle 100 in an autonomic control mode to execute a vehicle maneuver in response to an operator command without direct operator input to the primary control system i.e., steering wheel and accelerator pedal. The autonomic control system 30 executes in the autonomic control mode by monitoring inputs from the spatial monitoring system 16 and generating control signals that are transmitted to the powertrain control module 26 and the vehicle control module 28 to control speed and trajectory of the vehicle 100 to execute the desired vehicle maneuver. An example of an autonomic control mode includes controlling the vehicle 100 to execute a lane-change maneuver. Another example of an autonomic control mode includes maneuvering the vehicle 100 to execute a parking maneuver.

In operation the spatial monitoring system 16 determines position, speed and trajectory of other vehicles and objects to identify a clearing sufficient to permit the vehicle 100 to maneuver into an adjacent travel lane. When there is a sufficient clearing for entry of the vehicle 100 into the adjacent travel lane, the autonomic control system 30 sends a signal indicating lane change availability via lane change control system 22 (shown in FIGS. 2, 3, and 4) to the communications bus 24. Further, the spatial monitoring system 16 can send signals indicative of speed and location of other vehicles, for example, another vehicle in the same travel lane directly in front of the vehicle 100 that can be used to control the speed of the vehicle 100 as part of an adaptive cruise control system.

The vehicle monitoring system 15 monitors vehicle operation and communicates the monitored vehicle information to the communications bus 24. Monitored information preferably includes operator inputs to a steering wheel, an accelerator pedal and a brake pedal, and states of vehicle parameters including, e.g., vehicle speed, steering angle, and yaw rate. The vehicle operation can be monitored by a single control module as shown, or by a plurality of control modules. The vehicle monitoring system 15 preferably includes a plurality of chassis monitoring sensing systems or devices operative to monitor vehicle speed, steering angle and yaw rate, and preferably includes a yaw rate sensor, a lateral acceleration sensor, a steering angle sensor, and a vehicle speed sensor, none of which are shown. There is a steering wheel angle sensor operative to monitor operator input to steering via the steering wheel. The vehicle monitoring system 15 generates signals that can be monitored by the autonomic control system 30 and other vehicle control systems for vehicle control and operation.

The powertrain control module (PCM) 26 is signally and operatively connected to a vehicle powertrain (not shown), and executes control schemes to control operation of an engine, a transmission and other torque machines, to transmit tractive torque to the vehicle wheels in response to vehicle operating conditions and the operator inputs. The powertrain control module 26 is shown as a single control module, but can include a plurality of control module devices operative to control various powertrain actuators, including actuators associated with the engine, transmission, and torque machines that are elements of a hybrid powertrain system including wheel motors.

The vehicle control module (VCM) 28 is signally and operatively connected to a plurality of vehicle operating systems and executes control schemes to control operation thereof. The vehicle operating systems preferably include braking, stability control, and steering systems. The vehicle operating systems can also include other systems, e.g., HVAC, entertainment systems, communications systems, and anti-theft systems. The vehicle control module 28 is shown as single control module, but can include a plurality of control module devices operative to monitor systems and control various vehicle actuators.

The vehicle steering system preferably includes an active front steering system to augment or supplant operator input through a steering wheel 8 by controlling steering angle of the steerable wheels 60 during execution of an autonomic maneuver. An exemplary active front steering system permits primary steering operation by the vehicle operator including augmenting steering wheel angle control when necessary to achieve a preferred steering angle and/or vehicle yaw angle. The control methods described herein are applicable with modifications, to vehicle steering control systems such as electrical power steering, four/rear wheel steering systems, and direct yaw control systems which control traction of each wheel to generate a yaw motion.

The passenger compartment of the vehicle 100 includes an operator position having the steering wheel 8 mounted on a steering column 9. An input device 10 is preferably mechanically mounted on the steering column 9 and signally connects to a switch assembly control module (CM) 14. Alternatively, the input device 10 can be mechanically mounted proximal to the steering column 9 in a location that is convenient to the vehicle operator. The input device 10, shown herein as a stalk projecting from column 9, includes an interface device by which the vehicle operator can command vehicle operation in an autonomic control mode, e.g., by commanding activation of one or more autonomic vehicle control systems as described herein. The input device 10 preferably has control features and a location that is used by known turn-signal activation systems. Alternatively, other input devices, such as levers, switches, buttons, and voice recognition input devices can be used in place of or in addition to the input device 10. The switch assembly control module 14 signally connects to the communications bus 24 allowing communications with other control modules in the vehicle 100. The switch assembly control module 14 is operative to monitor signals output from the input device 10, discern an operator request based upon the signals output from the input device 10, and communicate various commands to the communications bus 24 which are read by the autonomic control system 30. For example, the autonomic control system 30 executes an autonomic control mode when it receives an activation command, taking into account signal outputs from the spatial monitoring system 16, including linear ranges, relative speeds, and trajectories of proximate remote objects.

FIGS. 2, 3, and 4 schematically show embodiments of the input device 10, 10', and 10" respectively, including the switch assembly control module 14. The input device 10 generates a signal indicating an operator input, if any, to the input device 10. The switch assembly control module 14 monitors the signals output from the input device 10 and generates an autonomic control mode activation command that is communicated to the autonomic control system 30 via the communications bus 24. The autonomic control module 30 responds to the activation command and commands operation in an autonomic control mode, including, e.g., executing an autonomic vehicle maneuver. The autonomic vehicle maneuver is preferably executed upon receipt of the activation command.

FIG. 2 shows the input device 10 in an exemplary embodiment including a switch assembly 12. The switch assembly 12 includes a housing portion 31, a pivoting assembly 32, a leaf spring 34 disposed between the housing portion 31 and the pivoting assembly 32, and position sensors 40, 42 and 44. The housing portion 31 defines an opening 48 and recess portions 50, 52, and 54. The position sensor 40 is disposed in the recess portion 50, the position sensor 42 is disposed in the recess portion 52, and the position sensor 44 is disposed in the recess portion 54. The pivoting assembly 32 is mounted in the housing portion 31 such that the pivoting assembly 32 pivots around a pivot point (P) and rotates therein. The pivoting assembly 32 connects to a stalk 56 extending through the opening 48 of the housing portion 31. The stalk 56 and pivoting assembly 32 are moveable to transition among positions including a neutral position 60, a detent position 62, and an extended detent position 64. The detent position 62 is intermediate the neutral position 60 and the extended detent position 64. The extended detent position 64 is a temporal position requiring the continuous application of force against the leaf spring return force.

It should be appreciated, that the stalk 56 and pivoting assembly 32 are further moveable to transition among positions including a second detent position and a second extended detent position that are positionally mirrored to the detent position 62 and the extended detent position 64, respectively, on a side opposite the neutral position 60. Therefore, the neutral position 60 is intermediate the detent position 62 and the second detent position. The second detent position is intermediate the neutral position 60 and the second extended detent position. The second extended detent position is a temporal position requiring the continuous application of force against a second leaf spring return force. Hence, the input device 10 is configured to generate signal outputs indicating vehicle maneuvers in the right or left directions.

The pivoting assembly 32 further includes a reference arm 68. The reference arm 68 includes a spring-loaded piston assembly 70 including a piston head 72. The piston head 72 includes a complementary geometry to the recess portions 50, 52, and 54, for engagement therewith. The piston head 72 engages the recess portion 50 when the stalk 56 is in the neutral position 60, the piston head 72 engages the recess portion 52 when the stalk 56 is in the detent position 62, and the piston head 72 engages the recess portion 54 when the stalk 56 is in the extended detent position 64.

The spring loaded-piston assembly 70 provides a biasing force to bias the piston head 72 against the recess portions 50, 52, and 54. The biasing force maintains the pivoting assembly 32 and stalk 56 in neutral position 60 and detent position 62 when the piston head 72 is within the recess portions 50 and 52, respectively. The leaf spring 34 biases the pivoting assembly 32 and stalk 56 away from extended detent position 64 toward the detent position 62, thereby preventing continuous engagement of the piston head 72 with the recess portion 54, and forcing the pivoting assembly 32 from the extended detent position 64 into the detent position 62 absent external forces on the stalk 56 from the vehicle operator. Thus, the extended detent position 64 is a temporal or volitionally maintained position.

The position sensors 40, 42 and 44 are provided to detect whether the piston head 72 engages recess portions 50, 52, and 54, respectively, and thus determine whether the stalk 56 is at one of the neutral position 60, the detent position 62, and the extended detent position 64. In an exemplary embodiment, the position sensors 40, 42, and 44 include contact type position sensors. The sensors 40, 42, and 44 send electrical signals S1, S2, and S3, respectively, to the switch assembly control module 14.

The vehicle operator can request activation and deactivation of the autonomic control system for maneuvering the vehicle by manipulating the stalk to 56 to one of the neutral position 60, the detent position 62, and the extended detent position 64. Position sensors 40, 42, and 44 send electrical signals S1, S2, and S3, respectively, to the switch assembly control module 14 in this embodiment. The switch assembly control module 14 interprets electric signals S1, S2, and S3 and sequencing of electrical signals S1, S2, and S3 from the switch assembly 12, processes the information, and provides pertinent information for use by other control modules via the communications bus 24. The switch assembly control module 14 receives the electrical signals S1, S2, and S3 from the sensors 40, 42, and 44 respectively and uses those signals to determine a state of the input device 10. The states of the input device 10 are states established by the vehicle operator corresponding to positions of the stalk 56. Exemplary states of the input device 10 include a reset state corresponding to the neutral position 60, a command state corresponding to the detent position 62, and an initiation state corresponding to the extended detent position 64.

The switch assembly control module 14 sends commands to the communications bus 24 based on operator command positions manipulated by the operator of the input device 10. In an exemplary embodiment, the switch assembly control module 14 sends an actuation command to the communications bus 24 to activate the autonomic control mode when a sequence of states of the input device 10 indicates an operator request to activate the autonomic control mode, e.g., a lane change maneuver. For example, when the switch assembly control module 14 receives electrical signals from the switch assembly 12 indicating that the input device 10 is in the reset state, the switch assembly control module 14 sets an initiation variable to deactivate the autonomic control mode. When the switch assembly control module 14 receives electrical signals from the switch assembly 12 indicating that the input device 10 is in the initiation state, the switch assembly control module 14 sets the initiation variable to enable the autonomic control mode. When the switch assembly control module 14 receives electrical signals from the switch assembly 12 indicating that the input device 10 is in the command state subsequent to the enablement of the autonomic control mode (i.e. subsequent to the input device 10 in the initiation state), the switch assembly control module 14 sends an actuation command to the autonomic control system 30 via the communications bus 24 to command activation of the autonomic control mode. When the switch assembly control module 14 receives signals from the switch assembly 12 indicating that the input device 10 is in the command state subsequent to the disablement of the autonomic control mode (i.e. subsequent to the input device in the reset state), the switch assembly control module 14 does not send the activation command to the autonomic control system 30. In other words, the initiation variable indicates the state of the input device prior to the command state.

In an exemplary embodiment, the switch assembly control module 14 enables the autonomic control mode when the input device 10 indicates the initiation state for an elapsed period of time. For example, the switch assembly control module 14 can monitor an elapsed period of time that the switch assembly control module 14 continuously receives signals from the switch assembly 12 indicating that the input device 10 is in the initiation state. The switch assembly control module 14 can set the initiation variable to enable the autonomic control mode after the input device 10 is continuously maintained in the initiation state for the selected time period. In one embodiment, the elapsed time period is two seconds.

In one embodiment, the switch assembly control module 30 provides feedback to the vehicle operator when the autonomic control mode is enabled. For example, the switch assembly control module 14 can send a feedback command to the communications bus 24 when the autonomic control mode is enabled, disabled, or activated. The feedback command can then be received by an audio system that provides a sound (such as a beep, tone, or verbal message) to the vehicle operator indicating that the autonomic control mode is enabled, disabled, or activated, or a visual system that provides a visual indicator (such as a light or visual icon) to the vehicle operator indicating that the autonomic control mode is enabled, disabled, or activated.

The autonomic control system 30 can include a plurality of control systems that interact with the powertrain control module 26 and the vehicle control module 28 to control vehicle operation during operation in the autonomic control mode. The automatic speed control system 18 interacts with the powertrain control module 26 to control operation of the engine and transmission to achieve a set vehicle operating speed. Vehicle speed can be monitored using a speed sensor that sends signals indicative of vehicle speed to the automatic speed control system 18. In one embodiment, the set speed can be determined based on an operator input, for example, an operator depressing a switch or button. In another embodiment the set speed can be determined based on a speed and position of another vehicle in the present lane of the vehicle 100. Signals indicative of the speed and of the current lane position of the vehicle 100 can be communicated to the autonomic control system 30 from the spatial monitoring system 16 via the communications bus 24.

The automatic steering system 20 controls steering angle of steerable wheels 60 of the vehicle 100. The automatic steering system 20 accesses information from the vehicle monitoring system 15, including vehicle speed, steering angle and yaw rate. The automatic steering system 20 uses the sensor information to determine inputs required to perform the autonomic vehicle maneuver, e.g., a lane change operation. In one embodiment, the automatic steering system uses sensor information to determine inputs to steering angles and durations to perform a lane change and then commands an actuator to operate the steerable wheels 60 at the selected steering angle. The automatic steering system 20 described above can be applied with modifications to various embodiments, to vehicle steering control systems such as electrical power steering, four/rear wheel steering systems, and direct yaw control systems which control traction of each wheel to generate a yaw motion. The lane change control system 22 commands operation of the automatic steering system 20 and the automatic speed control system 18 based on inputs from the spatial monitoring system 16, the switch assembly control module 14, along with inputs from other sensors and control modules.

FIG. 3 shows a second embodiment of the input device 10', including switch assembly 112 having a housing portion 130, a pivoting assembly 132, and position sensors 140 and 142. A stalk 156 having pressure sensitive portions 158 is connected thereto. The housing portion 130 defines an opening 148 and recess portions 150, 152. The position sensor 140 is disposed in the recess portion 150 and the position sensor 142 is disposed in the recess portion 152. The pivoting assembly 132 mounts the housing portion 130 such that the pivoting assembly 132 pivots around a pivot point (P). The pivoting assembly 132 connects to the stalk 156 extending through the opening 148 of the housing portion. The stalk 156 and pivoting assembly 132 are moveable to transition among positions including a neutral position 160 and a detent position 162. The pressure sensitive portions 158 include opposing conductive members separated by an insulative spacer member 159 that send the electrical signal S3 to the switch assembly control module 14'. When the stalk 156 is inadequately deformed, the electrical signal S3 is an open circuit, or a digital 'low' signal. When the stalk 156 is adequately deformed, the pressure sensitive portions 158 of the opposing conductive members physically contact each other, thereby completing an electric circuit. When the electric circuit is completed, the electrical signal S3 is a closed circuit, or a digital 'high' signal. Adequately deformed action may, for example, be via intentional hyper-extension beyond stalk axis 162 opposite stalk axis 160 or intentional squeezing/pinching sufficient to cause physical contact of the opposing pressure sensitive portions 158.

The pivoting assembly 132 further includes a reference arm 168. The reference arm 168 includes a spring-loaded piston assembly 170 including a piston head 172. The piston head 172 engages the recess portion 150 when the input device 10' is in the neutral position 160 and the piston head 172 engages the recess portion 152 when the input device 10' is in the detent position 162. The position sensors 140, 142 detect whether the piston head 172 engages recess portions 150, 152, respectively, and thus determine whether the input device 10' is at one of the neutral position 160 and the detent position 162. In one embodiment, the position sensors 140, 142, include contact-type position sensors that send electrical signals S1 and S2 to the switch assembly control module 14'.

The vehicle operator can command vehicle operation, including maneuvering the vehicle by manipulating the stalk 156 to the neutral position 160, the detent position 162, or to adequate deformation. Position sensors 140 and 142, and pressure sensitive portions 158 send electrical signals S1, S2, and S3, respectively, to the switch assembly control module 14' in this embodiment. The switch assembly control module 14' interprets electric signals S1, S2, and S3 and sequencing of electrical signals S1, S2, and S3 from the switch assembly 112, processes the information, and provides pertinent information for use by other control modules via the communications bus 24. The switch assembly control module 14' receives the electrical signals S1, S2, and S3 from the sensors 140, 142, and pressure sensitive portions 158 respectively and uses those signals to determine a state of the input device 10'. The states of the input device 10' are states established by the vehicle operator corresponding to inputs to the stalk 156. Exemplary states of the input device 10' include a reset state corresponding to the neutral position 160, a command state corresponding to the detent position 162, and an initiation state corresponding to adequate deformation of stalk 156.

The switch assembly control module 14' sends commands to the communications bus 24 based on operator manipulation of the input device 10' switched among operator command states. The switch assembly control module 14' sends an actuation command to the communications bus to activate the autonomic control mode when a sequence of operator command states of the input device 10' indicates an operator request to activate the autonomic control mode, e.g., a lane change maneuver. For example, when the switch assembly control module 14' receives electrical signals from the switch assembly 112 indicating that the input device 10' is in the reset state, the switch assembly control module 14' sets an initiation variable to deactivate the autonomic control mode. When the switch assembly control module 14' receives electrical signals from the switch assembly 112 indicating that the input device 10' is in the initiation state, the switch assembly control module 14' sets the initiation variable to enable the autonomic control mode. When the switch assembly control module 14' receives electrical signals from the switch assembly 112 indicating that the input device 10' is in the command state subsequent to the enablement of the autonomic control mode (i.e. subsequent to the input device in the initiation state), the switch assembly control module 14' sends an actuation command to the autonomic control system 30 via the communications bus 24 to command activation of the autonomic control mode. When the switch assembly control module 14' receives signals from the switch assembly 112 indicating that the input device 10' is in the command state subsequent to the disablement of the autonomic control mode (i.e. subsequent to the input device in the reset state), the switch assembly control module 14' does not send the activation command to the autonomic control system 30. In other words, the initiation variable indicates the state of the input device prior to the command state.

The switch assembly control module 14' enables the autonomic control mode when the input device 10' indicates the initiation state for an elapsed period of time. For example, the switch assembly control module 14' can monitor an elapsed period of time that the switch assembly control module 14' continuously receives signals from the switch assembly 112 indicating the input device 10' is in the initiation state. The switch assembly control module 14' can set the initiation variable to enable the autonomic control mode after the input device 10' is continuously maintained in the initiation state for the selected time period. In one embodiment, the elapsed time period is two seconds.

FIG. 4 shows a third embodiment of the input device 10", including switch assembly 112 having a housing portion 130, a pivoting assembly 132, and position sensors 140 and 142. A stalk 256 is connected thereto having electrically capacitive portions 258. The switch assembly 112 includes the housing portion 130, a pivoting assembly 132, and position sensors 140 and 142. The housing portion 130 defines an opening 148 and recess portions 150 and 152. The position sensor 140 is disposed in the recess portion 150 and the position sensor 142 is disposed in the recess portion 152. The pivoting assembly 132 mounts in the housing portion 130 such that the pivoting assembly 132 pivots around a pivot point (P). The pivoting assembly 132 connects to the stalk 256 extending through the opening 148 of the housing portion. The stalk 256 and pivoting assembly 132 are moveable to transition among positions including a neutral position 260 and a detent position 262. The stalk 256 includes the capacitive portions 258 having a dielectric portion therebetween. The capacitive portions 258 include a capacitive sensing system that conducts current across an electric current grid in the switch assembly control module 14" and builds up capacitive load when a vehicle operator touches or adequately deforms the stalk 256, indicated by signal S3. When the stalk 256 is adequately deformed (for example in a hyper-extended position beyond stalk position 262 opposite stalk position 260), there is an increase in the electrical potential, i.e., voltage across the capacitive portions 258 increases. When internal sensors of the capacitive sensing system of the switch assembly control module 14" detect changes in capacitive voltage levels greater than a threshold, the switch assembly control module 14" generates and sends a signal to the autonomic control system 30 indicating the enablement of the autonomic control mode. Similarly, when the stalk 256 is no longer maintained in the adequately deformed position wherein the capacitive portions 258 are proximal to each other, the capacitive voltage level decreases below the threshold.

The vehicle operator can command vehicle operation, including activating and deactivating an autonomic control system for maneuvering the vehicle by manipulating the stalk 256 to one of the neutral position 260, the detent position 262, or to adequate deformation. Position sensors 140 and 142 and the capacitive portions 258 send electrical signals S1, S2, and S3, respectively, to the switch assembly control module 14".

The switch assembly control module 14" receives the electrical signals S1, S2, and S3 from the position sensors 140, 142, and the capacitive portions 258, respectively, and uses the input signals to determine a state of the input device 10". The states of the input device 10" are states commanded by the vehicle operator corresponding to inputs to the stalk 256. Exemplary states of the input device 10" include a reset state corresponding to the neutral position 260, a command state corresponding to the detent position 262, and an initiation state corresponding to adequate deformation of stalk 256.

The switch assembly control module 14" sends commands to the communications bus 24 based on operator manipulation of the input device 10" switched among operator command states. The switch assembly control module 14" sends an actuation command to the communications bus to activate the autonomic control mode when a sequence of operator command states of the input device 10" indicates an operator request to activate the autonomic control mode, e.g., a lane change maneuver. For example, when the switch assembly control module 14" receives electrical signals from the switch assembly 112 indicating that the input device 10" is in the reset state, the switch assembly control module 14" sets an initiation variable to deactivate the autonomic control mode. When the switch assembly control module 14" receives electrical signals from the switch assembly 112 indicating that the input device 10" is in the initiation state, the switch assembly control module 14" sets the initiation variable to enable the autonomic control mode. When the switch assembly control module 14" receives electrical signals from the switch assembly 112 indicating that the input device 10" is in the command state subsequent to the enablement of the autonomic control mode (i.e. subsequent to the input device in the initiation state), the switch assembly control module 14" sends an actuation command to the autonomic control system 30 via the communications bus 24 to command activation of the autonomic control mode. When the switch assembly control module 14" receives signals from the switch assembly 112 indicating that the input device 10" is in the command state subsequent to the disablement of the autonomic control mode (i.e. subsequent to the input device in the reset state), the switch assembly control module 14" does not sent the activation command to the autonomic control system 30. In other words, the initiation variable indicates the state of the input device prior to the command state.

The switch assembly control module 14" enables the autonomic control mode when the input device 10' indicates the initiation state for an elapsed period of time. For example, the switch assembly control module 14" can monitor an elapsed period of time that the switch assembly control module 14" continuously receives signals from the switch assembly 112 indicating the input device 10" is in the initiation state. The switch assembly control module 14" can set the initiation variable to enable the autonomic control mode after the input device 10" is continuously maintained in the initiation state for the selected time period. In one embodiment, the elapsed time period is two seconds.

When the autonomic control mode is activated, the control system 30 executes in the autonomic control mode to complete autonomic tasks. Autonomic tasks can include a lane change or a parallel parking procedure, as previously described. Thus, an input device monitors an operator input to a stalk, for example embedded in a turn signal stalk. The operator is able to use the input device to intentionally activate an autonomic control mode, effecting the autonomic task. The input device is cognitively simple and intuitive to the operator, readily allows enablement, disablement and activation of the commanded task, and facilitates the enhanced vehicle functionality of autonomic tasks including lane changes and parallel parking procedures through adaptation of familiar vehicle controls (e.g. turn signal stalk).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for generating autonomic control mode commands to an autonomic control system in a vehicle to execute an autonomic vehicle maneuver in response to an operator command, comprising:
  a control module signally connected to said autonomic control system and an input device, the input device manipulated by an operator to transition among operator command positions and configured to generate signal outputs monitored by said control module indicating said operator command positions including a neutral position, a detent position and an extended detent position;
  wherein said input device further comprises:
    a reset state corresponding to said neutral position and monitored by said control module, wherein said control module commands the autonomic control system to deactivate said autonomic control mode;
    an initiation state corresponding to said extended detent position and monitored by said control module, wherein said control module commands the autonomic control system to enable said autonomic control mode; and
    a command state corresponding to said detent position and monitored by said control module, wherein said control module commands the autonomic control system to activate said autonomic control mode when said input device is operatively manipulated from said extended detent position and further does not command the autonomic control system to activate said autonomic control mode when said input device is operatively manipulated from said neutral position.

2. The apparatus of claim 1, wherein said input device has control features and a location used by turn-signal activation systems.

3. The apparatus of claim 1, wherein said detent position is intermediate said neutral and extended detent positions.

4. The apparatus of claim 1, wherein said input device further comprises a biasing member configured to bias said input member away from said extended detent position toward said detent position absent external forces on said input device from the vehicle operator.

5. The apparatus of claim 1, wherein said control module commands the autonomic control system to enable said autonomic control mode when said input device indicates the initiation state for an elapsed period of time monitored by said control module.

6. The apparatus of claim 5, wherein said elapsed period of time is two seconds.

7. The apparatus of claim 1, wherein said control module provides feedback to the vehicle operator when the autonomic control mode is deactivated.

8. The apparatus of claim 1, wherein said control module provides feedback to the vehicle operator when the autonomic control mode is enabled.

9. The apparatus of claim 1, wherein said control module provides feedback to the vehicle operator when the autonomic control mode is activated.

10. The apparatus of claim 1, wherein the input device further comprises a second detent position and a second extended detent position, wherein said neutral position is intermediate said detent position and said second detent position and said second detent position is intermediate said neutral position and said second extended detent position.

11. The apparatus of claim 10, wherein said input device further comprises a second biasing member configured to bias said input member away from said second extended detent position toward said second detent position absent external forces on said input device from the vehicle operator.

12. The apparatus of claim 10, wherein said initiation state corresponds to said second extended detent position and monitored by said control module, wherein said control module commands the autonomic control system to enable said autonomic control mode.

13. The apparatus of claim 10, wherein said command state corresponds to said second detent position and monitored by said control module, wherein said control module commands the autonomic control system to activate said autonomic control mode when said input device is operatively manipulated from said second extended detent position and further does not command the autonomic control system to activate said autonomic control mode when said input device is operatively manipulated from said neutral position.

14. An apparatus for generating autonomic control mode commands to an autonomic control system in a vehicle to execute an autonomic vehicle maneuver in response to an operator command, comprising:
  a control module signally connected to said autonomic control system and an input device;
  said input device manipulated by an operator to transition among operator command positions and configured to send electrical signals to said control module based on said operator command positions, wherein said control module generates said autonomic control mode commands based on said electrical signals to said autonomic control system, the operator command positions comprising:
    a neutral position indicating an electrical signal received by said control module to command said autonomic control system to deactivate said autonomic control mode;
    an extended detent position indicating an electrical signal received by said control module to command said autonomic control system to enable said autonomic control mode; and
    a detent position, intermediate said neutral and extended detent positions, indicating an electrical signal received by said control module to command said autonomic control system to activate said autonomic control mode when said input device is transitioned from said extended detent position and further indicating an electrical signal received by said control module to not command said autonomic control system to activate said autonomic control mode when said input device is transitioned from said neutral position.

15. The apparatus of claim 14, wherein said vehicle further includes a spatial monitoring system and a vehicle monitoring system and said vehicle is controlled using a powertrain control module, a vehicle control module, and said autonomic control system.

16. The apparatus of claim 15, wherein said spatial monitoring system detects remote objects proximate to said vehicle and determines a linear range, relative speed and trajectory of said remote objects and communicates the information to the autonomic control system.

17. The apparatus of claim 15, wherein said vehicle monitoring system includes devices operative to monitor vehicle speed, steering angle and yaw rate and communicates the information to the autonomic control system.

18. The apparatus of claim 15, wherein said powertrain control module executes control schemes to control operation of an engine, a transmission and other torque machines, to transmit tractive torque to the vehicle wheels in response to vehicle operating conditions and operator inputs.

19. The apparatus of claim 15, wherein said vehicle control module is signally and operatively connected to a plurality of vehicle operating systems including braking, stability control and steering systems and executes control schemes to control operation thereof.

20. The apparatus of claim 15, wherein the spatial monitoring system, the vehicle monitoring system, the powertrain control module, the vehicle control module and the autonomic control system communicate using a local area network communication bus.

21. The apparatus of claim 14, wherein said autonomic control system includes a lane change control system, an automatic steering system and an automatic speed control system.

22. The apparatus of claim 14, wherein said autonomic vehicle maneuver is a lane-change maneuver.

23. The apparatus of claim 14, wherein said autonomic vehicle maneuver is a parking maneuver.

24. An apparatus for generating autonomic control mode commands to an autonomic control system in a vehicle to execute an autonomic vehicle maneuver in response to an operator command, comprising:
a control module signally connected to said autonomic control system and an input device;
said input device manipulated by an operator to switch among operator command states and configured to send electrical signals to said control module based on said operator command states, wherein said control module generates said autonomic control mode commands based on said electrical signals to said autonomic control system, the operator command states comprising:
a reset state indicating an electrical signal received by said control module to command said autonomic control system to deactivate said autonomic control mode;
an initiation state indicating an electrical signal received by said control module to command said autonomic control system to enable said autonomic control mode; and
a command state indicating an electrical signal received by said control module to command said autonomic control system to activate said autonomic control mode subsequent to the enablement of the autonomic control mode and further indicating an electrical signal received by said control module to not command said autonomic control system to activate said autonomic control mode subsequent to the deactivation of the autonomic control mode.

25. The apparatus of claim 24, wherein said input device is moveable to transition among positions including a neutral position corresponding to said reset state and a detent position corresponding to said command state.

26. The apparatus of claim 24, wherein said input device comprises a pressure sensitive portion including an electrical signal having an open circuit when said pressure sensitive portion is inadequately deformed and a closed circuit when said pressure sensitive portion is adequately deformed for an elapsed period of time.

27. The apparatus of claim 24, wherein said input device comprises a capacitive portion configured to increase capacitive load when adequately deformed and said capacitive load is monitored by said control module and compared to a threshold.

28. The apparatus of claim 26, wherein said elapsed period of time is at least two seconds.

29. The apparatus of claim 26, wherein said closed circuit when said pressure sensitive portion is adequately deformed for said elapsed period of time corresponds to the initiation state.

30. The apparatus of claim 27, wherein said capacitive load is compared to a threshold corresponds to said initiation state when said capacitive load is greater than said threshold.

* * * * *